(12) United States Patent
Horwitz

(10) Patent No.: US 7,588,821 B2
(45) Date of Patent: Sep. 15, 2009

(54) SCRATCH RESISTANT THERMOPLASTIC ARTICLE

(75) Inventor: David J Horwitz, Savannah, GA (US)

(73) Assignee: Duracase Proprietary LLC, Ridgeland, SC (US)

( * ) Notice: Subject to any disclaimer, the term of this patent is extended or adjusted under 35 U.S.C. 154(b) by 0 days.

(21) Appl. No.: 11/359,093

(22) Filed: Feb. 22, 2006

(65) Prior Publication Data

US 2006/0141214 A1    Jun. 29, 2006

Related U.S. Application Data

(60) Division of application No. 10/482,594, filed as application No. PCT/US03/15758 on May 20, 2003, now abandoned, which is a continuation-in-part of application No. 10/151,506, filed on May 20, 2002, now abandoned.

(51) Int. Cl.
    B32B 5/16      (2006.01)
    B32B 18/00    (2006.01)
    B32B 27/00    (2006.01)

(52) U.S. Cl. .................. 428/323; 428/325; 428/500

(58) Field of Classification Search ............. 428/323, 428/325, 474.7, 500
    See application file for complete search history.

(56) References Cited

U.S. PATENT DOCUMENTS

| | | | |
|---|---|---|---|
| 2,899,288 A | 8/1959 | Barclay | |
| 3,816,155 A * | 6/1974 | Iverson et al. | 428/151 |
| 3,919,164 A | 11/1975 | Hattori et al. | |
| 4,390,585 A | 6/1983 | Holden | |
| 4,787,837 A | 11/1988 | Bell | |
| 4,889,762 A | 12/1989 | Uchiyama et al. | |
| 4,921,669 A | 5/1990 | Vetter et al. | |
| 5,387,381 A | 2/1995 | Saloom | |
| 5,658,980 A * | 8/1997 | Ichikawa | 524/523 |
| 5,662,977 A | 9/1997 | Spain et al. | |
| 5,763,048 A | 6/1998 | Takahashi | |
| 5,783,620 A * | 7/1998 | Hamashima et al. | 524/405 |
| 5,866,639 A | 2/1999 | Dorchester et al. | |
| 6,106,654 A | 8/2000 | Velin et al. | |
| 6,239,196 B1 | 5/2001 | Bussi et al. | |
| 6,258,201 B1 | 7/2001 | Krech | |
| 6,265,029 B1 | 7/2001 | Lewis | |
| 6,503,426 B1 | 1/2003 | Horwitz | |
| 6,822,024 B1 * | 11/2004 | Spirkowyc et al. | 524/109 |
| 2003/0215607 A1 | 11/2003 | Horwitz | |
| 2004/0234749 A1 | 11/2004 | Horwitz | |

FOREIGN PATENT DOCUMENTS

WO    PCT/US03/15758    12/2003

OTHER PUBLICATIONS

3M, Zeeospheres Ceramic Microspheres White Grades, Product Information Sheet, Aug. 1999, 2 pages, 3M Specialty Materials, St. Paul, MN.
International Search Report PCT/US03/15758, ISA/US, Aug. 7, 2003, 4 pages.

* cited by examiner

*Primary Examiner*—Sheeba Ahmed
(74) *Attorney, Agent, or Firm*—J. Bennett Mullinax, LLC

(57) ABSTRACT

A process and resulting thermoplastic article is provided suitable for use in constructing furniture. The thermoplastic article contains hardened particulates such as powders of alumina oxide or ceramic microspheres which bring about an improved cut and scratch resistance to the surface of the articles. The hardened particulates may be integrally mixed with the extruded product or applied post-molding to a surface of the shaped article. In addition, spherical additives may be included in the extrusion polymer which reduces shear forces and provides an improved wood grain appearance in the extruded article.

6 Claims, 2 Drawing Sheets

US 7,588,821 B2

SCRATCH RESISTANT THERMOPLASTIC ARTICLE

RELATED APPLICATIONS

This application is a divisional of U.S. patent application Ser. No. 10/482,594, filed Dec. 24, 2003 now abandoned, which is a National Entry of PCT/US03/15758 filed May 20, 2003, and which is a continuation-in-part of U.S. patent application Ser. No. 10/151,506 filed on May 20, 2002 now abandoned, and which is incorporated herein by reference.

FIELD OF THE INVENTION

This invention is directed towards a process and the resulting product of an extruded thermoplastic sheet or a molded thermoplastic article having improved abrasion resistance and scratch-resistant properties. The improved properties are achieved by the addition of a plurality of particles of a hardened substrate, such as aluminum oxide, which may be incorporated into the thermoplastic material. The particulate additive imparts greater wear resistance and scratch resistance to the thermoplastic structure.

This invention is further directed towards a process and the resulting product of an extruded thermoplastic sheet having an improved wood grain appearance. In particular, a process and resulting product is provided in which extruded thermoplastic sheets having a width of between 36 inches to 64 inches are produced, the sheets having an improved wood grain pigmentation along the sheet edges.

BACKGROUND OF THE INVENTION

Thermoplastic materials are widely used as a material for articles of manufacture. For instance, it is known in the art to use thermoplastic polyvinyl chloride (PVC) to mold articles of furniture such as chair frames and other furniture articles. The PVC resin is often provided with an integral wood grain finish to simulate the appearance of real wood. While thermoplastic polymer sheets and profiles offer high impact resistance, the wear resistance and abrasion resistance is low.

It is difficult to obtain extruded sheets such as PVC having therein a good wood grain appearance over a wide sheet width. A wood grain effect is achieved in an extruded sheet by forcing a cylinder of molten polymer at high pressure from an extruder barrel through a die which directs the molten thermoplastic material into a flattened, rectangular shape. To achieve a wood grain effect, plastic pellets are added which only partially melt as they go through the extruder. The resin pellets which provide the wood grain appearance are selected from materials having higher melting points than the base polymer. In a typical extruder/die combination for extruding flat sheets, the center of the die has a lower resistance to molten plastic flow than the edges of the die. As a result, the molten plastic flows more easily through the middle of the die as opposed to the edges of the die. Because of lower shear along the center of the die, the pigmented pellets preferentially flow through the die center. As a consequence, the molten sheets typically exhibit a more pronounced grain pattern in the middle of the sheet. The intensity of the grain degrades towards the edges of the sheet, the effect becoming more noticeable as the width of the extruded sheet increases. As a result, there remains a need within the art for developing improved extrusion techniques which provides for an enhanced grain appearance across the entire width of an extruded sheet.

It is also known to apply decorative films, papers, and surface polymer layers to the laminated structure to improve the appearance of the product. However, such overlayments are often thin and, hence, prone to damage and not easily repaired.

U.S. Pat. No. 6,106,654 provides a thermoset laminate in which a paper web impregnated with melamine-formaldehyde resin is applied as a surface layer to the laminate. The sheet is coated with the impregnated paper, one side of the paper containing aluminum oxide particles.

U.S. Pat. No. 5,763,048 discloses a PVC substrate having a protective layer of a cured resin having polycarbonate particles mixed with the resin. The resin is cured by applying ionizing radiation to the PVC substrate.

U.S. Pat. No. 4,921,669 discloses scratch resistant coating suitable for use with a PVC substrate in which a separate coating of a monomer mixture is applied to the PVC surface by polymerization. The monomer has a high cross-linking density and provides good scratch resistance.

While there are a variety of scratch resistant coatings and resins known within the art, there remains room for improvement and variation within the art.

SUMMARY OF THE INVENTION

It is one aspect of one of the present embodiments to provide for an extruded thermoplastic polymer which incorporates an effective amount of a particulate additive such as aluminum oxide, the particulate additive providing scratch resistance and wear resistance to the extruded polymer.

It is yet another aspect of at least one of the present embodiments to provide a process of incorporating an effective amount of a hardened particulate which is incorporated directly into the thermoplastic polymer during the compounding of the polymer and prior to extrusion.

It is yet another aspect of at least one of the present embodiments to provide a process of providing an extruded thermoplastic polymer in which an effective amount of a particulate additive to provide scratch resistance is incorporated into a polymer extruding step.

It is yet an additional aspect of at least one of the present embodiments to provide a molded thermoplastic polymer containing between about 1% to about 10% by weight of an inorganic filler selected from the group consisting of silicate, silica oxide, fumed silicas, alumina, aluminum oxide, ceramics, ceramic microspheres, and combinations thereof, and having a particle diameter of about 4 to about 10 microns.

It is another aspect of at least one of the present embodiments to provide a thermoplastic sheet or extrusion molded profile in which particulates are embedded into a surface of the sheet by pressure application of the particulates into the softened surface.

It is yet another aspect of at least one of the present embodiments to provide a process of providing a scratch resistant coating to a thermoplastic extrusion product comprising the steps of: providing a thermoplastic extruded product having a surface temperature heated to a softening temperature; concentration of about 1 to about 25 grams per square meter; mechanically pressing the particulate into the surface of the extruded product using a pressure of about 150 to about 200 pounds per linear inch; and allowing the thermoplastic material and pressed particles to cool.

It is yet another aspect of at least one of the present embodiments to provide a thermoplastic extruded sheet having a scratch resistant surface comprising the steps of: providing a thermoplastic extruded sheet; embossing a surface of said thermoplastic sheet, thereby imparting a matte finish to the sheet, the matte finish comprising a series of surface elevations and depressions; warming the matte surface to a softening temperature; applying a plurality of particulates onto the matte surface; and applying pressure to the matte surface and the particulates, thereby embedding the particulates into the matte surface.

It is yet another aspect of at least one of the present embodiments to provide a thermoplastic article comprising a molded thermoplastic panel, the panel having an upper surface and a lower surface; a plurality of particulates selected from the group consisting of silicas, silica oxides, fumed silicas, alumina, alumina oxides, ceramics, ceramic-microspheres, and combinations thereof, the plurality of particulates positioned within at least a portion of the panel which includes at least one of the upper surface or the lower surface; wherein, the plurality of particulates improves the scratch resistance of at least one of the upper surfaces or the lower surfaces.

It is yet another aspect of at least one of the present embodiments to provide a process and resulting sheet in which ceramic microspheres are incorporated into a thermoplastic polymer prior to extrusion. The microspheres reduce shear through the extruder die and thereby increase the uniformity and quality of any wood grain pigmentation contained therein. In addition, the microspheres provide an improved scratch and cut resistance to the extruded sheet. Further, the lower shear pressures during extrusion result in a sheet having improved physical properties useful in forming laminated foam sheets.

It is yet another aspect of at least one of the present embodiments to provide for a compounded thermoplastic resin containing therein an effective amount of spherical additives so as to reduce the amount of shear during a subsequent extrusion step.

It is yet another aspect of at least one of the present embodiments to provide for a compounded, thermoplastic polymer containing an effective amount of ceramic microspheres to improve scratch resistance properties of articles made from the extruded sheet.

It is yet another aspect of at least one of the present embodiments to provide a thermoplastic extruded sheet containing therein a sufficient amount of microspheres to render the sheet and articles formed from the sheet more resistant to scratches than similar articles without the microspheres.

It is yet another aspect of at least one of the present embodiments to provide a process of forming a thermoplastic extruded sheet comprising the step of incorporating an effective amount of a shear reducing spherical additive into the thermoplastic polymer such that the spherical additives reduce the polymer shear forces generated during extrusion.

It is yet another aspect of at least one of the present embodiments to provide an extrusion process and resulting sheet having a simulated wood grain appearance in which the extruded sheet has a width greater than 36" and in which the wood grain has substantially uniform qualities and appearance along the entire width of the sheet.

The sheets, panels, and other articles made in accordance with the present invention are useful in a variety of hard-wearing surface applications. Such applications include, but are not limited to, counter tops, flooring, and commercial or residential furniture items.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers may be used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

Figure 1:
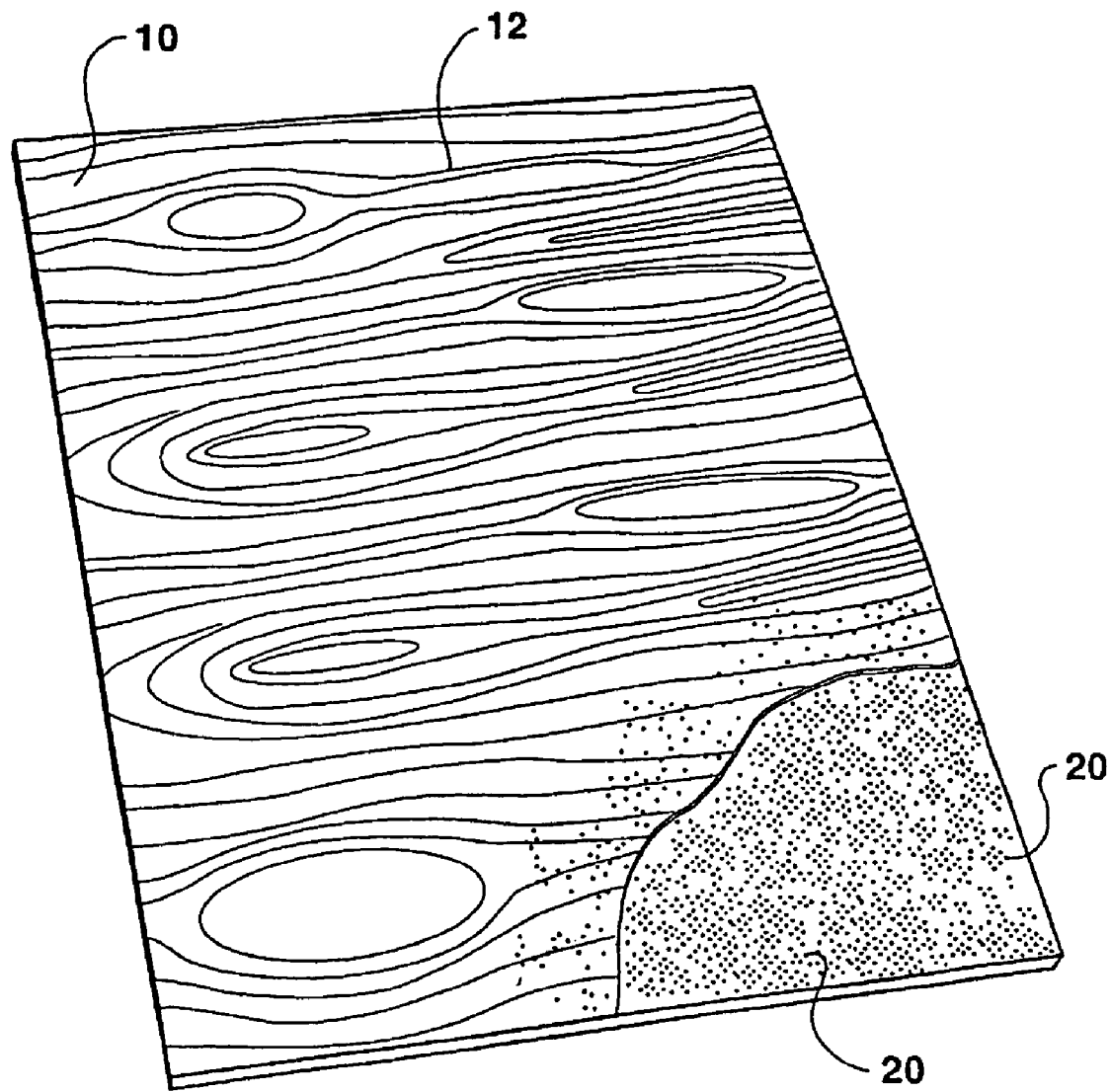
FIG. 1 is a perspective view of one embodiment of thermoplastic sheet made in accordance with the present invention.

As best seen in reference to FIG. 1, a first embodiment of the invention is set forth. An extruded article, seen here as a thermoplastic extruded PVC sheet 10 is provided which may have a pigmented grain pattern 12 such as a wood grain pattern. Contained within the sheet is a plurality of particles 20 such as aluminum oxide particles or ceramic microspheres. The particles may be in a granular form, preferably have high hardness values, and typically have a roughly spherical shape. However, other shapes of particles as well as variations in particle sizes may be used and which will offer satisfactory results of improved scratch resistances Suitable hardened particles include particulates of silica, silica oxides, fumed silicas, alumina, aluminum oxides, ceramic materials, ceramic microspheres, and combinations thereof which possess high strength and high abrasion resistance properties. In this embodiment, the particles are mixed substantially uniformly throughout the sheet.

The size and/or diameter of the particulates for imparting scratch resistance is not believed to be critical. In accordance with this invention, it has been found that a particle size of between about 4 to about 10 microns (1000 to 1200 grit) for aluminum oxide (Reade Advanced Materials, Providence, R.I.) has been found to impart good scratch resistance and wear properties to the thermoplastic extrusion product 10 when present in a concentration of between about 1% to about 10% by weight. As a general rule, increasing the amount of hardened particles within the thermoplastic material increases the cut and scratch resistance and abrasion resistance of the resulting thermoplastic molded article. Alternatively, concentrating the amount of particulates present along at least one surface region of the molded article, as described below, also brings about beneficial improvements in the wear properties and scratch resistance of the extruded sheet or molded article. Larger or smaller average-sized particulates may also be used.

One preferred additive includes ceramic microspheres such as Zeeospheres™ (3M) part number W-610. The ceramic microspheres are solid spheres of an alkali alumino silicate ceramic. The microspheres are characterized by high strength and have a hardness value of 6 on the Mohs scale. The average particle size (mean) is 10 microns. The Zeeospheres™ are known to be used in coating formulations to provide abrasion resistance. However, in accordance with the present invention, Applicant has found that incorporating the microspheres into a thermoplastic polymer prior to extrusion results in the thermoplastic extruded article having improved scratch resistance.

The improvement in scratch resistance of a ceramic microsphere containing article is readily-apparent using simple steel wool scrub and abrasion tests. Extrusions having the ceramic microspheres can have surface imperfections or flaws "buffed out" using fine steel wood. The repaired areas do not leave visible signs or surface alterations as a result of the buffing. In contrast, thermoplastic extruded materials without the ceramic microspheres will, following buffing with fine steel wool, leave permanent high-gloss spots on the surface of the sheet.

In addition, the incorporation of ceramic microspheres offers additional benefits to the sheet extrusion process. While not wishing to be limited by theory, it is believed that the microspheres act to reduce shear forces as the plastic molten material flows through the die. As a result of the reduced shear, there is less variation in pressure and forces across the width of the die profile. The benefits of the reduced shear is readily apparent when extruding material containing color pellets. Heretofore, the pigmented thermoplastic pellets tended to flow through the center of the die where there was lower resistance. As a result, the center of the resultant sheet had more noticeable pigmentation in terms of color intensity as well as simulated wood grain streaks than the edges of the sheet.

By incorporating the ceramic microspheres into the thermoplastic polymer, it is believed that shear forces are reduced or at least made more uniform across the die profile. Accordingly, a better distribution and flow of the thermoplastic pigment particles through the entire width of the die has been observed. While the noted shear improvement was seen with respect to ceramic microspheres, it is believed that other spherical-shaped additives may offer similar improvements in shear properties through the die. The evaluation of spherical materials suitable for reducing shear can be readily determined by producing sample polymer batches having the respective additives to be evaluated.

The resulting sheets have a marked improvement in appearance. Attractive wood grain properties are now present throughout the entire width of the extruded sheet. As a result, there is significantly less waste of the extruded sheets when used in furniture articles where wood grain appearance is important. Not only is the wood grain appearance of the sheets improved, the resulting articles also demonstrate excellent scratch resistance.

In addition to PVC, other suitable thermoplastic resins may be used to form extruded or molded thermoplastic articles. Such thermoplastic materials include styrene-based polymers, olefins, polyamides, combinations thereof, and similar materials which are well known within the art. Additionally, the improvements in scratch resistance and extrusion performance would have benefits with extruded thermoset materials.

A thermoplastic article as set forth in FIG. 1 may be made by incorporating the particulates directly into the thermoplastic polymer. The particulates may be added during the compounding stage prior to the polymer extrusion. It is one aspect of the present invention to provide for a pre-compounded thermoplastic polymer having effective amounts of shear-reducing ceramic microsphere additives already incorporated. Alternatively, a dosing screw or other metering device may be used to introduce the hardened particles directly to the extruder. In either event, the thermoplastic article contains a plurality of particulates which are distributed throughout the polymer material.

Figure 2:
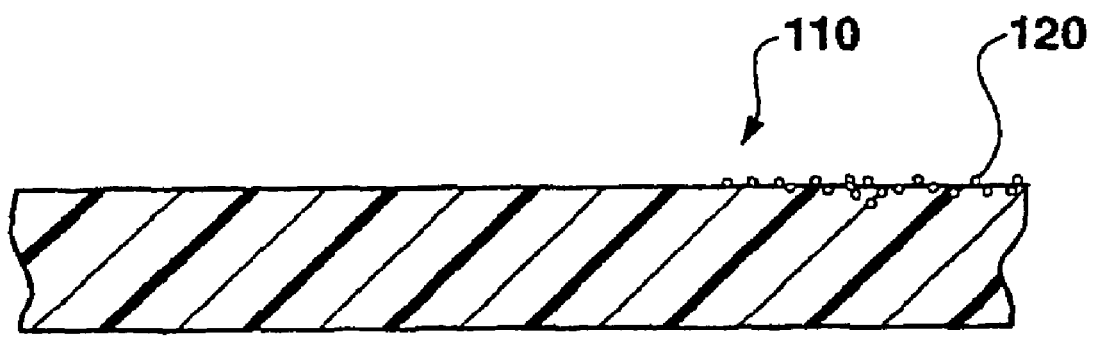
FIG. 2 is an alternative embodiment of a thermoplastic sheet made in accordance with the present invention.

As seen in reference to FIG. 2, an alternative embodiment of a thermoplastic article may be seen in reference to a thermoplastic sheet of PVC 110. A coating of particulates 120 is applied to the surface of the molten sheet as the molten sheet exits the extruder die. The particulates may be applied by a pneumatic sprayer, a mechanical duster, or through an electrostatic dispersion. The particulates are applied at a concentration of between about 1 to about 25 grams per square meter. When so dispersed, the particulates make contact with the surface of the molten sheet. When applied prior to cooling of the molten sheet, the particulates may be mechanically pressed into the upper molten polymer layer by an application of pressure. Suitable pressure may be applied using nip rollers or the use of a pressure responsive platen. A pressure roller, nip roller, or calendaring roll may be used to apply a pressure of about 150 to about 200 pounds per linear inch to sheet extrusion product. Vacuum pressure platens may be used in the type rollers. Following the pressure application of the particulates into the molten surface of the thermoplastic material, the subsequently impregnated sheet or profile is then cooled as is conventional within the art.

It is also possible to apply the particulates to the surface of the thermoplastic material following the initial production of the article. In such instances, the previously formed thermoplastic sheet or profile is heated to a surface softening temperature and the particulates are then applied to the surface of the article as described above. Following application, the mechanical pressure is applied as described above. If desired, the particulates may also be heated to a temperature greater than the softening temperature of the thermoplastic polymer prior to application. In so doing, the particulates may more readily adhere to the surfaces to be coated.

Figure 3:
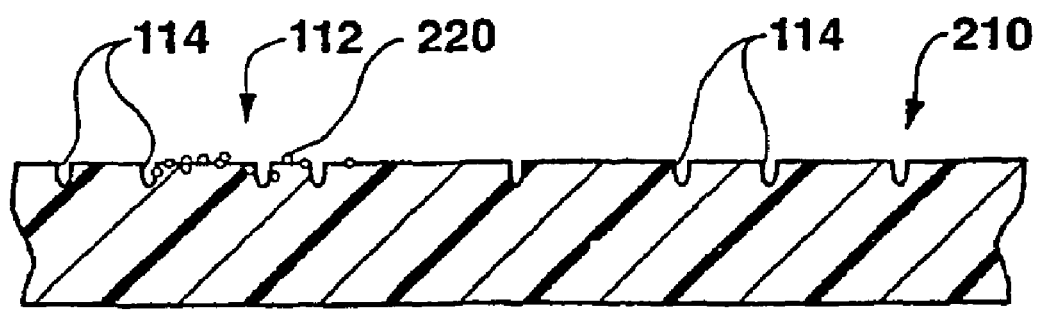
FIG. 3 is a third alternative embodiment setting forth a thermoplastic sheet having an embossed surface made in accordance with the present invention.

A third embodiment of the present invention is seen in reference to FIG. 3. FIG. 3 sets forth a molded thermoplastic article as seen in the form of an extruded sheet 210. A surface of the extruded sheet is embossed using a conventional embossing roller which creates a matte effect to the sheet. The embossing roller places a series of raised surfaces 112 and depressions 114 along the sheet surface. Following embossing, the matte surface of the sheet is raised to a softening temperature whereupon the desired concentration of hardened particles 220 is applied and then pressed into the surface of the sheet. As best seen in reference to FIG. 3, the elevated ridges 212, along with the other surface regions, become coated with a pressed layer of particulates. As a result, the surface now defines a region containing a number of particulates which impart excellent abrasion and scratch resistant properties to the molded article. Further, the matte-like surface of the alternating elevated regions and depressions serve to minimize the appearance of scratches and other surface imperfections which may occur.

In addition, as set forth in detail in Example 1 below, it is also possible to coat or otherwise introduce the particulate additive to the extruded sheet prior to a subsequent surface embossing step.

The thermoplastic, surface-hardened materials are particularly well suited for use in constructing furniture from the thermoplastic laminates. For instance, a thermoplastic PVC resin may be provided in which a simulated wood grain appearance is created by the use of pigments mixed in with the PVC resin. The PVC pigmented resin provides an attractive wood grain 12 (FIG. 1) to the resulting molded furniture article. By incorporating particulates within the thermoplastic material or by placing a surface layer of hardened particulates along the surfaces of the thermoplastic molded article, the surface finish has improved resistance to cuts and scratches. When used in materials such as a pigmented wood grain thermoplastic article, the hardened particulates do not alter or detract from the desired pigmentation of the extruded product.

The thickness of the PVC or other thermoplastic polymer products may be varied depending upon the capabilities of the extrusion equipment and the desired end use. With respect to making articles of furniture and thermoplastic panels which may be used in the construction of furniture, a PVC thickness of between about 1 mm to about 4 mm is sufficient. One way of making panels and various articles of furniture using wood grained PVC can be found in relation to U.S. Pat. No. 6,503, 426 B1, and which is incorporated herein by reference in its entirety. U.S. Pat. Nos. 5,866,639 and 5,387,381 additionally describe extrusion of plastic sheets having pigmented grain patterns. The teachings of these two references are hereby incorporated herein by reference. In reference to the incorporated patents, the extruded articles may be modified according to the present invention to have an effective amount of the particulates. Such particulates may be mixed uniformly throughout the extruded article, such as one made from PVC or may be applied to one or more of the exterior surfaces of the article. As discussed above, one or more surfaces of the PVC article may be embossed which further minimizes the appearance of scratches and allows a coating of the scratch-resistant particulates to be applied to the embossed surface and to the immediately adjacent region of the thermoplastic material.

It is also envisioned that the wear-resistant and scratch-resistant thermoplastic polymer sheets described herein may also be used as the wear surface of a flooring composite material. The thermoplastic sheets may be molded and cut to desired shapes and thicknesses and may be optionally secured to other substrates so as to render a composite material suitable for use as a flooring material, stair treads, counter tops, or other similar articles designed for high wear applications.

Articles made in accordance with the present invention were evaluated according to test standards set forth in NEMA Standards Publication LD 3-2000 and which are incorporated herein by reference. In all instances, the inclusion of the particulates in the thermoplastic article brings about an improvement in the resistance to abrasions, cuts and scratches. Additional details of construction may be found in reference to Example 1 below.

EXAMPLE 1

A high impact, thermoplastic wood-grain polyvinyl chloride sheet was extruded from a 60-inch sheet die set at a 2.8 mm thickness. As the extruded thermoplastic sheet exited the extruder, a coating of aluminum oxide particulate was electrostatically applied onto the top of the warm sheet at a concentration of 20 grams/meter.sup.2. The aluminum oxide had an average particle size of between about 4 to about 10 microns.

The molten PVC sheet, coated with the aluminum oxide particles, is passed through embossed calendaring rollers at a pressure of about 150 pounds per linear inch. The gap between the rollers was set at 2.4 mm in thickness. The resultant embossed sheet was cooled and tested for abrasion resistance using Wear-Resistant Test 3.13 and the Linear Glass Scratch-Resistance Test-3.7 as set forth in NEMA Publication LD 3-2000.

The wear-resistance procedure 3.13 uses sand paper placed on abrader wheels to determine resistance to abrasive wear through. Using the evaluation apparatus and materials set forth in the NEMA 3.13 publication, a wear-resistance of 3,200 cycles is obtained which exceeds NEMA specifications for a high wear substrate.

Test method 3.7 was also used to determine linear glass scratch resistance of the coated sheet surface. Test method 3.7 uses a scratch tool having a sharpness and hardness similar to silica. The scratch resistance of the above described sheet was determined to be 150 grams with the product sample having a tristimulus Y value (lightness) of 30. These values represent a high scratch resistant property for the evaluated thermoplastic sheet.

Control samples of extruded PVC lacking the aluminum oxide particulates fail to achieve the NEMA standards for high wear resistance and exhibit poor scratch resistance values.

EXAMPLE 2

A thermoplastic wood grain polyvinyl chloride sheet was extruded from a 64-inch sheet die set at a 2.4 mm thickness. The PVC thermoplastic polymer was provided by Aurora Plastics, Inc., Aurora, Ohio, Product No. AP2253. During the compounding stage, about 4% to about 6% by weight of pigmented pellets (Viking Polymers LLC, Jamestown, N.C.) were added along with approximately 5.6% by weight loading of ceramic microspheres available from 3M as Zeeospheres™ W-610. The resulting compound was fed into a twin extruder (Milacron E86 counter rotating conical twin) at a temperature of about 280.degree. F. The molten plastic was then forced from the extruder barrel through a rectangular die set at a 2.4 mm thickness and having a width of 64". A pressure of 4,700 psi was applied to the molten plastic through the extruder.

The resulting extruded sheet was allowed to cool and thereafter the sheets may be used in a conventional manner. The extruded sheet 10 (FIG. 1) had a well established wood grain pattern 12 extending across the entire width of the sheet. When compared to control sheets lacking the ceramic microsphere additive, the control sheets had useful grain properties only along a center of the sheet. The outer edges of the control sheet lacked good grain distinction and, where present, wood grain streaks tended to not be parallel with the longitudinal direction of the sheet but rather were curved or angled toward the sheet center.

In addition to the improved wood grain properties, the resulting sheets were resistant to any visible cosmetic damage or changes when hand rubbed with fine, abrasive steel wool. In contrast, control sheets developed permanent high-gloss spots where the steel wool treatment was applied.

With respect to the ceramic microspheres, a loading of about 5.6% by weight into the polymer has been found to be effective in providing scratch resistance properties as well as improving the shear properties during extrusion. It is believed that improvements in both scratch resistance and low as 1% and more preferably in the range of about 4% to about 8% by weight. One having ordinary skill in the art would not require undue experimentation in order to identify an effective amount of microspheres needed to provide scratch resistance and/or shear reduction in an extruded product.

The ceramic microspheres are also effective in improving the wood grain properties or marble-type grain patterns where such pigments are present. Further, to the extent shear is reduced, the resulting sheet has better overall strength properties. The strength properties are particularly useful during the formation of urethane foamed laminates using the thermoplastic sheets. As is known in the art, urethane foaming processes generate high temperatures and pressures. The sheets manufactured according to the present process are believed to have improved structural integrity-which makes the sheets less resistant to distortion during pressure foaming steps.

The incorporation of the ceramic microspheres produces a dramatic improvement in the wood grain appearance of the resulting sheet, such that the amount of pigmentation needed in order to achieve a desired end product may be reduced. Further, the inclusion of the ceramic microspheres does not adversely affect the commercial production process in any manner. The improvement in scratch resistance and visible grain properties occur without having to lessen the extrusion output/extrusion rate. As a result, a process and end product is provided having a desirable grain evenly distributed over the entire width of a 64" sheet and having excellent scratch resistance. The improved grain appear properties minimize product waste which otherwise occurred from poor wood grain properties along extruded sheet edges. In addition, the improved scratch and cut resistance also decreases manufacturing costs in that less damage to resulting articles occurs and minor damage which may occur is more readily repaired without degrading the surface appearance. Further, wide sheets (36" or greater) may be produced which have acceptable grain pigmentation and definition across the entire sheet width.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

The invention claimed is:

1. A polyvinyl chloride thermoplastic article comprising:
an extruded polyvinyl chloride thermoplastic panel having an upper surface and a lower surface, said panel having a width and a thickness;
a plurality of pigmented pellets distributed across the width of said panel at said upper surface of said panel, wherein said plurality of pigmented pellets are arranged so as to provide an aesthetic pigmented grain pattern; and
about 1% to about 10% by weight of a microsphere additive, said microsphere additive substantially uniformly distributed throughout said panel such that said microsphere additive is located in said panel, wherein the presence of said microsphere additive causes the article to be more resistant to scratches than similar articles without said microsphere additive;
wherein said thermoplastic panel has a more uniform grain appearance across the width of said panel than a thermoplastic panel without the microsphere additive as the presence of said microsphere additive functions to more uniformly distribute the plurality of pigmented pellets across the width of said panel.

2. The polyvinyl chloride thermoplastic article according to claim 1 wherein said microsphere additive is a solid ceramic microsphere.

3. The polyvinyl chloride thermoplastic article according to claim 1 wherein said microsphere additive is present in a concentration of at least about 4% to 6% by weight.

4. The polyvinyl chloride thermoplastic article according to claim 1 wherein said thermoplastic panel has a width greater than 36 inches.

5. The polyvinyl chloride thermoplastic article according to claim 4 wherein said woodgrain patterns are substantially parallel with a longitudinal direction of said panel.

6. The polyvinyl chloride thermoplastic article according to claim 1 wherein said upper surface and said lower surface of said panel defines a gloss free surface following buffing with steel wool.

* * * * *